Patented Apr. 6, 1954

2,674,554

UNITED STATES PATENT OFFICE 2,674,554

SOLDERING FLUX

Chester A. Snell, New York, and Jacob M. Fain and John A. De Rosa, Brooklyn, N. Y., assignors to the United States of America as represented by the Secretary of the Army No Drawing. Application December 20, 1951,
Serial No. 262,654

2 Claims. (Cl. 148—25)

The invention described herein may be manufactured and used by or for the Government for governmental purposes without payment of any royalty thereon.

This invention relates to soldering fluxes and more particularly to soldering fluxes in paste form adapted for use in soft soldering on all the common metals, including copper, tin, zinc, nickel and their alloys. Those metals more difficult to solder, such as stainless steel and aluminum can be worked upon with the fluxing compositions hereinafter described, if some abrasion of the metal is resorted to during the soldering step. The solder herein described can be used both as an external flux or for inclusion in the hollow core of the solder wire.

One of the important properties which characterize a good flux is that it should only superficially attack the metal and yet it should loosen the oxide film and dissolve, or otherwise displace, any loosened oxide particles.

Another highly desirable property in a flux is the ability to cause a spreading of the solder over the prepared surface.

Still another required property which is important, especially in situations where there are delicate metal surfaces to be soldered such as in radio or electrical equipment, is that the flux should not leave a corrosive residue. Such residues tend to promote electrolytic corrosion between solder and the metal and may thus cause ultimate failure of the joint under unfavorable atmospheric conditions. Furthermore, in many cases, it is difficult if not impracticable, to wash or otherwise remove the flux residue. Hence, considerable effort has been made to provide flux compositions that leave non-corrosive residues, or no residue at all. Heretofore, some soft soldering fluxes in paste form, intended for use in joining the more common metals and their alloys, contained various paste forming constituents which, remaining on the soldered joints, effected the formation of soft and permeable residues which are objectionable as pointed out above.

Other soldering flux pastes have been made in the past which are based upon aqueous dispersions of soaps made from resins and volatile alkaline materials which invariably left some undecomposed soap in their residue, and the soldered joints in contact with such residues are subject to the same type of attack under certain unfavorable atmospheric conditions as was noted for other flux pastes.

With the view in mind of overcoming each of the difficulties set forth above, it is an object of the present invention to provide a flux in paste form which is substantially non-corrosive.

It is a further object of the invention to provide an active soldering flux which can be used in soft soldering on practically all metals.

It is a still further object of the invention to provide an active soft soldering flux suitable for inclusion in the hollow core of solder wire.

These and other objects and features of the present invention will be apparent as the detailed description thereof progresses.

The present invention is based upon the discovery that by combining a resin and quaternary ammonium salt in a cyclic hydrocarbon solvent with the aid of heat and adding a soap after the solution has been cooled, a paste flux will be formed, after permitting the resultant gel obtained from combining the above ingredients to remain at room temperature for approximately 24 hours. A specific example and its detailed steps of formation will be hereafter set forth.

The resin base of such compositions could include any resin that ordinarily has some fluxing properties of its own. Examples of this include rosin-abietic acid, Nuroz, Staybelite, and Teglac resins. Of the resins mentioned immediately supra, Nuroz is a trade name for partially polymerized pale wood rosins, Staybelite is a trade name for hydrogenated rosin characterized by resistance to oxidation and discoloration and Teglac is a trade name for synthetic alkyd resins modified with natural resin acids and possessing good film-forming properties. The cyclic hydrocarbon solvent could be of either the aromatic or the terpene types. Examples of such cyclic hydrocarbons are xylene, tetrahydro-naphthalene, and turpentine. One having a boiling range at or slightly below the fusion temperature of the solder is preferable, as it is less likely to be retained in a residue and yet it will not cause the composition to dry out easily when exposed to the open air. Although not so limited, typical of a metallic soap forming one of the constituents herein is aluminum stearate.

In the flux compositions with which this invention is concerned, the resin should preferably comprise from 49 to 50% of the total weight; the quaternary ammonium salt may vary between 8 and 9%; the metallic soap may constitute between 2 and 3% and the solvent from 39 to 40%. The consistency of the flux ultimately formed mainly on the soap and solvent contents and by varying the amounts between the criteria set forth above, the consistency of the resultant flux will vary from a soft to a stiff paste depending upon the type of flux desired. A typical example of a flux formed according to this invention is set forth below:

| | Per cent |
|---|---|
| Rosin | 49 |
| Cetyl trimethyl ammonium bromide | 9 |
| Aluminum stearate | 3 |
| Turpentine | 39 |

The method of preparation of a paste flux by combining the ingredients set forth above is substantially as follows. The rosin and cetyl trimethyl ammonium bromide are dissolved in the turpentine with the aid of heat. After the solution is cooled to about 35° C., the aluminum stearate is thoroughly stirred into it until no lumps are present. In order to insure that the aluminum stearate is thoroughly dissolved, this mixture is heated to about 75° C. and constantly stirred during such heating step. Such heating step is maintained until a translucent liquid or gel is obtained. The gel so obtained will vary from a viscous liquid to a fairly firm gelled paste. The product so obtained is permitted to stand at room temperature for a period of about 24 hours to allow for the gelatination to proceed. At such time the paste is ready for use as an external flux or for filling hollow solder wire.

While there has been described what at present is considered to be the preferred embodiment of the invention, it will be understood by those skilled in the art that various changes and modifications may be made herein without departing from the invention and it is therefore aimed in the appended claims to cover all such modifications as fall within the spirit and scope of the invention.

What is claimed is:

1. A soldering flux consisting essentially of about 9% by weight of cetyl trimethyl ammonium bromide, 2-3% by weight of aluminum stearate, 39-40% by weight of a cyclic hydrocarbon solvent selected from the group consisting of xylene, tetrahydro-naphthalene and turpentine and the remainder, a resin selected from the group consisting of rosin-abiaetic acid, partially polymerized rosins, and hydrogenated rosins.

2. A soldering flux consisting essentially of about 49% by weight of rosin, 9% by weight of cetyl trimethyl ammonium bromide, 3% by weight of aluminum stearate and 39% by weight of turpentine.

References Cited in the file of this patent

UNITED STATES PATENTS

| Number | Name | Date |
|---|---|---|
| 2,095,335 | Kofke | Oct. 12, 1937 |
| 2,429,033 | Silman et al. | Oct. 14, 1947 |
| 2,553,226 | Williams | May 15, 1951 |

FOREIGN PATENTS

| Number | Country | Date |
|---|---|---|
| 464,906 | Great Britain | Nov. 3, 1938 |
| 557,816 | Great Britain | Dec. 7, 1943 |